United States Patent [19]
Callan

[11] 3,912,684
[45] Oct. 14, 1975

[54] PELLETIZED SEMI-VULCANIZED BUTYL RUBBER

[75] Inventor: John E. Callan, Trenton, N.J.

[73] Assignee: Cities Service Oil Company, Tulsa, Okla.

[22] Filed: Jan. 18, 1974

[21] Appl. No.: 434,468

[52] U.S. Cl.. 260/33.6 AQ; 260/42.36; 260/85.3 C; 260/85.3 R
[51] Int. Cl.².. C08K 5/01; C08K 3/36; C08C 19/00
[58] Field of Search.. 260/85.3 C, 85.3 R, 33.6 AQ, 260/42.36

[56] References Cited
UNITED STATES PATENTS

| | | | |
|---|---|---|---|
| 2,403,966 | 7/1946 | Brown, Jr. et al. | 260/85.3 R |
| 2,547,733 | 4/1951 | Baldwin | 260/85.3 C |
| 2,557,641 | 6/1951 | Dudley | 260/85.3 C |
| 3,123,581 | 3/1964 | Shuart et al. | 260/42.36 |
| 3,674,735 | 7/1972 | Callan | 260/42.36 |

Primary Examiner—Alan Holler
Attorney, Agent, or Firm—Patricia J. Hogan

[57] ABSTRACT

Compositions of the invention comprise pelletized semi-vulcanized butyl rubber compositions which are contact-solvatable (i.e., readily solvated in solvents without the need for mechanical agitation) and non-remassable (i.e., capable of maintaining their discrete form both during storage and when contacted with solvents). They are useful for producing sealant caulks and other solvent-release mastics.

4 Claims, No Drawings

PELLETIZED SEMI-VULCANIZED BUTYL RUBBER

BACKGROUND OF THE INVENTION

1. Field of the Invention

This invention relates to semi-vulcanized butyl rubber compositions and more particularly relates to such compositions which are especially suitable for use in preparing solvent-release mastics.

2. Description of the Prior Art

It is known that semi-vulcanized butyl rubber compositions are useful for preparing sealant caulks and other solvent-release mastics but that the prior art compositions have had a normally solid, massed form which has created problems in solvating them. Thus, even when their normally massed form has been altered by chopping or otherwise sizing them after formation so as to provide a surface area suitable for solvation, they have remassed during storage or upon contact with a solvent and have required the use of intense agitation for dissolution.

SUMMARY OF THE INVENTION

An object of this invention is to provide novel semi-vulcanized butyl rubber compositions which are suitable for the preparation of sealant caulks and other solvent-release mastics.

Another object is to provide such compositions which are contact-solvatable and non-remassable.

A further object is to provide such compositions in a form suitable for the attainment of such properties.

These and other objects are attained by partially vulcanizing a butyl rubber in the presence of a plasticizer and an inert filler to form a semi-vulcanized composition having a Mooney viscosity (ML-3 at 260°F.) of about 25-40 and pelletizing the semi-vulcanized composition.

DESCRIPTION OF THE PREFERRED EMBODIMENTS

The butyl rubber employed in the practice of the invention is usually an isobutylene/isoprene copolymer containing about 0.5-5% by weight of combined isoprene. However, it may be any interpolymer of a major proportion of one or more isoolefins containing about 4-7 carbon atoms (e.g., isobutylene, ethyl methyl ethylene, etc.) and a minor proportion of one or more conjugated diolefins containing about 4-8 carbon atoms (e.g., butadiene-1,3; isoprene; piperylene; 2,3-dimethylbutadiene-1,3; 3-methylpentadiene-1,3; 2-methylpentadiene-1,3; hexadiene-1,3; hexadiene-2,4, etc.). As indicated above, these interpolymers generally contain about 0.5-5% by weight of combined diene, and they seldom contain more than about 10% by weight of this component. The rubber usually has a molecular weight such as to give a Mooney viscosity (ML-1+8 at 212°F.) of 40-80.

The vulcanizing agent may be any of those conventionally used for the preparation of semi-vulcanized butyl rubber compositions but is advantageously p-quinone dioxime or a halogenated phenolic resin. It is used in an amount sufficient only to partially vulcanize the rubber, the exact amount naturally being dependent on the molecular weight of the raw butyl rubber and the Mooney viscosity desired for the semi-vulcanized composition.

As indicated above, this Mooney viscosity (ML-3 at 260°F.) must be in the range of about 25-40, the reason being that a lower degree of vulcanization would not make the rubber resistant to remassing in storage containers and solvents, and a higher degree of vulcanization would not permit the rubber to be solvated without mechanical agitation. Ordinarily, it is preferred that the Mooney viscosity of the semi-vulcanized composition be in the range of about 30-35, and the amount of vulcanizing agent is chosen accordingly.

The plasticizer may be any of the plasticizers normally used in such compositions and is suitably a non-aromatic extender oil and/or a low molecular weight polybutene. Naphthenic rubber process oils are particularly advantageous. The plasticizer is used in an amount consonant with the preparation of a semi-vulcanized composition having the desired Mooney viscosity and is ordinarily used in an amount such as to impart a Mooney viscosity (ML-3 at 260°F.) of about 15-25 to the unvulcanized composition. This amount is usually in the range of about 10-40%, based on the weight of the unvulcanized rubber.

The nature of the inert filler is not critical as long as the material is inert with respect to the vulcanizing agent. However, it is usually preferred to employ diatomaceous earth. This component is generally used in an amount of about 10-50%, based on the weight of the unvulcanized rubber.

If desired, the unvulcanized composition may also contain other ingredients, such as those frequently used in compounding. However, these other ingredients may be added to the semi-vulcanized composition instead.

The particular manner in which the butyl rubber is partially cured is not critical, but it is often advantageous to employ conditions which permit the curing to be accomplished in about 1-5 minutes at about 250°-350°F. This permits the use of conventional rubber and processing equipment, such as Banbury mixers, extruders, and the like. However, other curing conditions may be employed if desired.

One useful technique of effecting the cure is to add all of the aforementioned ingredients to an internal mixer and subject the mixture to mastication and heat until the desired reaction has occurred. In this technique, all of the ingredients may be added at once, or they may be added sequentially. It is sometimes desirable to add the ingredients as rapidly as possible, and it may often be advantageous to preblend two or more of the ingredients before adding them to the mixer.

Another technique is to add the other ingredients to a butyl rubber cement (i.e., a solution or pseudosolution of butyl rubber in an organic solvent) either before or while removing the solvent therefrom in an agitated body of hot water, and passing the wet crumb thus obtained into an extrusion drier for removal of water and semi-vulcanization of the butyl rubber.

The semi-vulcanized composition may conveniently be pelletized by forcing it through an extruder fitted with a die plate and a rotating knife blade to form pellets having a size suitable for subsequent solvation. Ordinarily, it is advantageous to form in this manner pellets which are about 0.25-0.5 inch in length and about 0.25-0.5 inch in diameter, preferably about 0.25 inch in length and about 0.25 inch in diameter.

The pellets thus formed are generally capable of remaining discrete units, but the prevention of remassing may be insured by coating them with a pulverized antitack agent, such as talc, clay, calcium carbonate, zinc stearate, etc. When employed, this coating may be deposited from a suitable mechanism adjacent to or fitted on the extruder.

An alternative method of insuring the prevention of remassing is to inject steam, air, or other gas into the pelletizing extruder to effect an apparently low specific gravity that makes the pellets more accessible to solvent as well as more resistant to remassing.

These techniques of insuring the prevention of remassing, when employed, may be employed in conjunction with one another.

The pelletized semi-vulcanized compositions of the invention are contact-solvatable and non-remassable. Thus, they may be stored indefinitely before solvation without requiring presolvation cutting, shredding, or the like; and they may be dissolved in any of the solvents normally used for solvent-release butyl-based mastics (e.g., mineral spirits, toluene, naphtha, etc.) simply by contacting them with a suitable amount of the solvent (generally about 1–2, preferably about 1, part by weight per part by weight of pellets) and allowing the mixture to stand for a suitable length of time, usually at least 16 hours, most commonly about 24–48 hours. When an excess of solvent is used, supernatant liquid will be found, but this can be blended with the solution by charging the mixture to a mixer and working it for about 1–5 minutes to form a uniform, homogeneous blend.

When desired, soluble additives, such as low molecular weight polybutenes, may be incorporated into the compositions during solvation. However, these and the other ingredients normally used in solvent-release butyl-based mastics are normally incorporated after solvation and any homogenization. The mastics thus prepared from the compositions of the invention are as satisfactory as those prepared from prior art compositions.

The following examples are given to illustrate the invention and are not intended as a limitation thereof. Unless otherwise specified, quantities mentioned are quantities by weight.

EXAMPLE I

Feed (A) 100 parts of a butyl rubber having a Mooney viscosity of 55 (ML–3 at 260°F.), (B) 30 parts of naphthenic rubber process oil, (C) 30 parts of diatomaceous earth, and (D) 0.55 part of a bromomethyl alkylated phenol-formaldehyde resin into a Banbury mixer heated at 265°F. and running at second speed. After 4–5 minutes of mastication, dump the mixture into an extruder which is bathed with cold water and fitted with a pelletizing head to form pellets having a length and diameter of about 0.25 inch. Pass the pellets through a talc slurry to coat them with about 0.5–1 part of talc. Cool the pellets and package them.

EXAMPLE II

Add 100 parts of the pellets of Example I to 100 parts of mineral spirits and allow the mixture to stand without agitation. After 48 hours there are no non-dispersible lumps, and there is no supernatant liquid. This solvated pellet mixture can then be added to a suitable low-shear mixer, together with the usual compounding ingredients, to produce a caulk or other solvent-release mastic.

EXAMPLE III

Repeat Example II except for employing 150 parts of mineral spirits. After 48 hours of standing, there are no non-dispersible lumps but some supernatant liquid. After the mixture has been mixed for 5 minutes in a sigma blade mixer, a uniform, homogeneous blend is obtained. This blend can then be mixed with the usual compounding ingredients in a suitable low-shear mixer to prepare a caulk or other solvent-release mastic.

It is obvious that many variations may be made in the products and processes set forth above without departing from the spirit and scope of this invention.

What is claimed is:

1. A pelletized, contact-solvatable, non-remassable, semi-vulcanized butyl rubber composition having a Mooney viscosity (ML–3 at 260°F.) of about 25–40; said composition comprising a semi-vulcanized butyl rubber and, based on the weight of said rubber prior to vulcanization, about 10–40% by weight of plasticizer and about 10–50% by weight of inert filler.

2. The composition of claim 1 having a Mooney viscosity of about 30–35.

3. The composition of claim 1 wherein the pellets are about 0.25–0.5 inch in length and about 0.25–0.5 inch in diameter.

4. The composition of claim 3 wherein the pellets are about 0.5 inch in length and about 0.5 inch in diameter.

* * * * *

UNITED STATES PATENT OFFICE
CERTIFICATE OF CORRECTION

Patent No. 3,912,684          Dated October 14, 1975

Inventor(s) John E. Callan

It is certified that error appears in the above-identified patent and that said Letters Patent are hereby corrected as shown below:

Page 1, left hand column, line 4, the Assignee should read--Cities Service Company--.

Signed and Sealed this twentieth Day of January 1976

[SEAL]

Attest:

RUTH C. MASON
Attesting Officer

C. MARSHALL DANN
Commissioner of Patents and Trademarks